United States Patent
Lin et al.

(10) Patent No.: US 8,977,221 B2
(45) Date of Patent: Mar. 10, 2015

(54) SELECTING APPARATUS FOR RECEIVING ANTENNA OF MULTIPLE INPUT MULTIPLE OUTPUT WIRELESS SYSTEM AND METHOD THEREOF

(75) Inventors: Yu-Nan Lin, Taichung (TW); Kuang-Yu Yen, Taichung (TW)

(73) Assignee: Realtek Semiconductor Corp., Hsinchu (TW)

( * ) Notice: Subject to any disclaimer, the term of this patent is extended or adjusted under 35 U.S.C. 154(b) by 2102 days.

(21) Appl. No.: 11/940,641

(22) Filed: Nov. 15, 2007

(65) Prior Publication Data

US 2008/0119141 A1 May 22, 2008

(30) Foreign Application Priority Data

Nov. 17, 2006 (TW) ................. 95142668 A

(51) Int. Cl.
*H04B 1/06* (2006.01)
*H04B 7/08* (2006.01)
*H04B 7/04* (2006.01)
*H04B 17/00* (2006.01)

(52) U.S. Cl.
CPC ............... *H04B 7/0874* (2013.01); *H04B 7/04* (2013.01)
USPC ............................ 455/277.1; 455/562.1

(58) Field of Classification Search
USPC ............... 455/277.1–277.2, 562.1; 370/334; 375/267, 347
See application file for complete search history.

(56) References Cited

U.S. PATENT DOCUMENTS

| 2003/0161410 A1 | 8/2003 | Smith et al. | |
|---|---|---|---|
| 2006/0056345 A1* | 3/2006 | Marinier et al. | 370/329 |
| 2006/0176974 A1* | 8/2006 | Smith et al. | 375/267 |

FOREIGN PATENT DOCUMENTS

CN 1640012 7/2005

OTHER PUBLICATIONS

Abstract for US 20030161410 (A1).

\* cited by examiner

*Primary Examiner* — Lee Nguyen
(74) *Attorney, Agent, or Firm* — McClure, Qualey & Rodack, LLP

(57) ABSTRACT

A selecting apparatus for receiving antennas of a Multiple Input Multiple Output wireless system and a method thereof are disclosed. The method for selecting antennas includes the following steps. Select a set of receiving antenna sequentially by a selective and control unit so as to receive an input data. Then a signal processing module deals with the input data to generate output data sets. An operation unit processes at least one of the multiple sets of output data for generating a detection data that is sent to a determining unit. According to the detection data, the determining unit generates a control signal that is sent to the selective and control unit for driving the selective and control unit to select a set of antenna to be used.

21 Claims, 3 Drawing Sheets

| set | set of antennas |
|---|---|
| First set | First、Second and Third antenna |
| Second set | First、Second and Fourth antenna |
| Third set | First、Second and Fifth antenna |
| Foutth set | First、Third and Fourth antenna |
| Fifth set | First、Third and Fifth antenna |
| Sixth set | First、Fourth and Fifth antenna |
| Seventh set | Second、Third and Fourth antenna |
| Eighth set | Second、Third and Fifth antenna |
| Ninth set | Second、Fourth and Fifth antenna |
| Tenth set | Third、Fourth and Fifth antenna |

Fig. 2

SELECTING APPARATUS FOR RECEIVING ANTENNA OF MULTIPLE INPUT MULTIPLE OUTPUT WIRELESS SYSTEM AND METHOD THEREOF

BACKGROUND OF THE INVENTION

The present invention relates to a Multiple Input Multiple Output wireless system, and especially to a selecting apparatus for receiving antennas of a Multiple Input Multiple Output wireless system and a method thereof.

For higher transmission speed and larger transmission range, Multiple Input Multiple Output (MIMO) system is used. By using multiple transmit and receive antennas, space multiplexing offers several subchannels for data transmittance. Thus, MIMO system allows each of the independent signal streams being modulated and transmitted through a different antenna at the same time. Although several antennas are used as multiple receiving pathways to increase accuracy of signal detection, only a limited number of integral receiving pathway is allowed in practice if considering power consumption and hardware complexity. When only a signal stream is transmitted at one time, the receiving antenna with the highest signal energy is selected as the signal-receiving source for signal detection. When several signal streams are sent at the same time, the above-mentioned method will no longer work. Methods and apparatuses with higher power consumption or more complicated design will be needed to finish the task of the signal detection. For example, such as those involving computation of determinants that run in the frequency domain.

Thus, there is a need to provide a new selecting apparatus for receiving antennas of the Multiple Input Multiple Output System and a method thereof that not only overcome shortcomings of conventional receiving antennas but also simplifies complicated design of hardware.

SUMMARY OF THE INVENTION

Therefore it is a primary object of the present invention to provide a selecting apparatus for receiving antennas of Multiple Input Multiple Output System and a method thereof that construct an efficient selecting mechanism for receiving antennas so as to achieve best receiving effect.

It is another object of the present invention to provide a selecting apparatus for receiving antennas of Multiple Input Multiple Output System and a method thereof that simplify the complicated hardware design of selecting mechanism for receiving antennas.

In order to achieve the above objects, the present invention consists of a selective and control unit, a signal processing module, an operation unit and a determining unit. The method for selecting antenna includes the following steps. The selective and control unit selects a set of receiving antenna in turn for receiving an input data. Then the signal processing module deals with the input data to generate output data. The operation unit processes at least one of the multiple sets of output data so as to generate a detection data. According to the detection data, the determining unit generates a control signal that is sent to the selective and control unit for driving the selective and control unit to select a set of antenna to be used.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 2 is a list of combinations of antennas of an embodiment according to the present invention.

DETAILED DESCRIPTION OF THE PREFERRED EMBODIMENT

Figure 1:
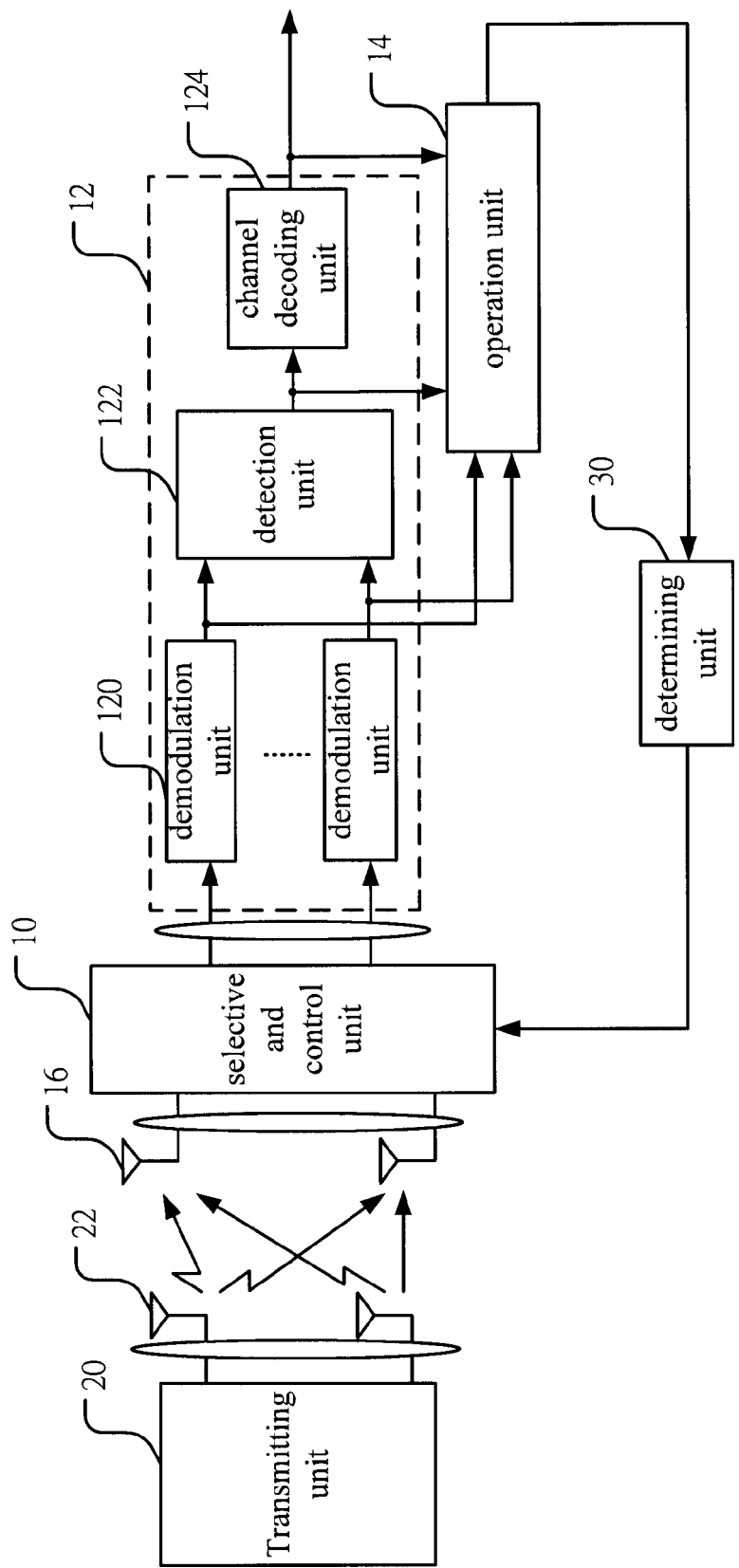
FIG. 1 is a block diagram of an embodiment according to the present invention.

Referring to FIG. 1, a selecting apparatus for receiving antennas of a Multiple Input Multiple Output (MIMO) system is illustrated according to the present invention. The selecting apparatus consists of a selective and control unit 10, a signal processing module 12, an operation unit 14 and a determining unit 30. The selective and control unit 10 is resides in a receiving end and is coupled to several receiving antennas 16. A set of receiving antennas is selected in turn for receiving input data transmitted from several transmitting antennas 22 on a transmitting end. The input data includes packets sent through network.

The signal processing module 12 deals with input data from each set of receiving antennas 16 and generates several output data while the operation unit 14 receives at least one of the output data and processes the data so as to generate detection data. According to the detection data, the determining unit 30 generates a control signal that is sent to the selective and control unit 10 for driving the selective and control unit 10 to choose one set of receiving antenna 16 being used. The determining unit 30 is may exist in the Media Access Control (MAC) layer while the selective and control unit 10, the signal processing module 12, the operation unit 14 and the receiving antenna 16 reside in the physical layer of the network system.

In an embodiment, the signal processing module 12 consists of several demodulation units 120, a detection unit 122 and a channel decoding unit 124. The demodulation units 120 receive the input data from one set of receiving antenna 16 selected by the selective and control unit 10 and demodulate the input data so as to generate a first output data. The detection unit 122 detects the first output data for generating a second output data. The channel decoding unit 124 decodes the second output data so as to generate a third output data. According to at least one of the aforementioned data, i.e. the first output data, the second output data, and the third output data, the operation unit 14 generates detection data.

The detection data includes Error Vector Magnitude (EVM), Post-Detection signal-to-noise ratio (SNR), Channel State Information (CSI), and/or information related to the Media Access Control (MAC) layer. The detection data is obtained through operation of the operation unit 14 according to the output data and is provided to the determining unit 30 to decide which set of the receiving antennas 16 is to be used. If there are some data for checking the channel state and relates to the received Modulation Coding Scheme (MCS), the returned Channel State Information are statistics obtained from a given Modulation Coding Scheme.

The detection data is obtained from various combinations of antennas that are changed through the Physical Layer. Thus, the following two embodiments for collecting detection data are disclosed according to different applications.

In one embodiment, the device shifts to another set of receiving antenna by the selective and control unit 10 after a set of receiving antenna receives at least one packet. When all possible combinations of antennas have been detected, the detection data required is obtained completely.

In another embodiment, the determining unit 30 decides the timing of shifting for each set of antenna. According to the initial detection data, the determining unit 30 confirms that the at least one packet received is really for itself and then shifts to another set of receiving antenna by the selective and control unit 10. When all combinations of antennas have been shifted in turn by the determining unit 30, the complete detection data is obtained. The initial detection data includes header at the Media Access Control (MAC) layer. While being applied to the end of a network card, unnecessary packets are filtered because only one corresponding access point (AP) transmits corresponding packets to the network ward.

In a preferred embodiment, the determining unit 30 applied to a single transmitting end compares at least one of the detection data of each set of the receiving antenna 16 such as Error Vector Magnitude (EVM), Post-Detection signal-to-noise ratio (SNR), Channel State Information (CSI) with a threshold for selecting a set of receiving antenna 16 to be used.

In another preferred embodiment, the determining unit 30 applied to several transmitting ends may even receive detection data of each set of the receiving antenna 16 repeatedly. Then according to at least one of the detection data including data such as Error Vector Magnitude (EVM), Post-Detection signal-to-noise ratio (SNR), Channel State Information (CSI), the determining unit 30 selects one set of the receiving antenna 16 to be used. While receiving detection data of each set of the receiving antenna 16 repeatedly, the sum of the detection data of each set of the receiving antenna 16 represents reception quality. For example, a set of the receiving antenna 16 with better reception quality is selected according to sum of the Post-Detection SNR. Moreover, according to the repeated detection data, some sets of the receiving antennas 16 are detected a multiple of times so as to make sure that the reception quality is better. For example, after being detected for a multiple of times, the Post-Detection signal-to-noise ratio of some sets of the receiving antenna 16 is larger than a certain dB value. Thus, these receiving antennas 16 with better reception quality are selected for quality assurance. However, under consideration of saving time, the detected data of each set of the receiving antenna 16 is compared with a threshold in turn. Once the detection data is higher than the threshold, detection stops and the set of receiving antenna 16 corresponding to this detection data is selected. Although the more times repeated for each set of the receiving antenna 16 leads to a higher accuracy of selection, an increase of the time consumed is also accompanied.

When the determining unit 30 has selected a set of receiving antenna 16 to be used, the determining unit 30 checks whether there is a need to re-select a new set of receiving antenna 16 according to the detection data that is still being received by the receiving antenna 16. For example, when there is a dB gap between the Post-Detection signal-to-noise ratio of the received certain amount of packets, or when the number of subcarriers with the highest level is increased or decreased by a certain amount of number during the detection of the Channel State Information (traffic channel state has changed). A new set of receiving antenna 16 may be considered in this case. If Packet Error Rate (PER) is observed to be increased or statistics of the Modulation Coding Scheme of the received packets are always lower than a certain value, a new set of receiving antenna 16 is selected. In addition, it is feasible to reset a set of receiving antenna 16 after receiving a certain amount of packets each time so as to simplify the task of checking.

Referring to FIG. 2 & FIG. 1, when there are five receiving antennas and three receiving paths, ten combinations is listed. The selective and control unit 10 selects one of these ten sets of receiving antennas 16 for receiving signals to be processed by the signal processing module 12.

After dealing with the input data received by one set of the receiving antenna 16 selected from the first to the tenth sets of antennas, the signal processing module 12 generates output data of one of the ten sets of antennas. Then the operation unit 14 performs operations on the output data by selecting from one of the ten sets to generate detection data. Then according to the detection data, the determining unit 30 generates a control signal that is transmitted to the selective and control unit 10 so as to drive the selective and control unit 10 to select one set of receiving antenna from the ten sets of receiving antennas 16 to be used.

Figure 3:
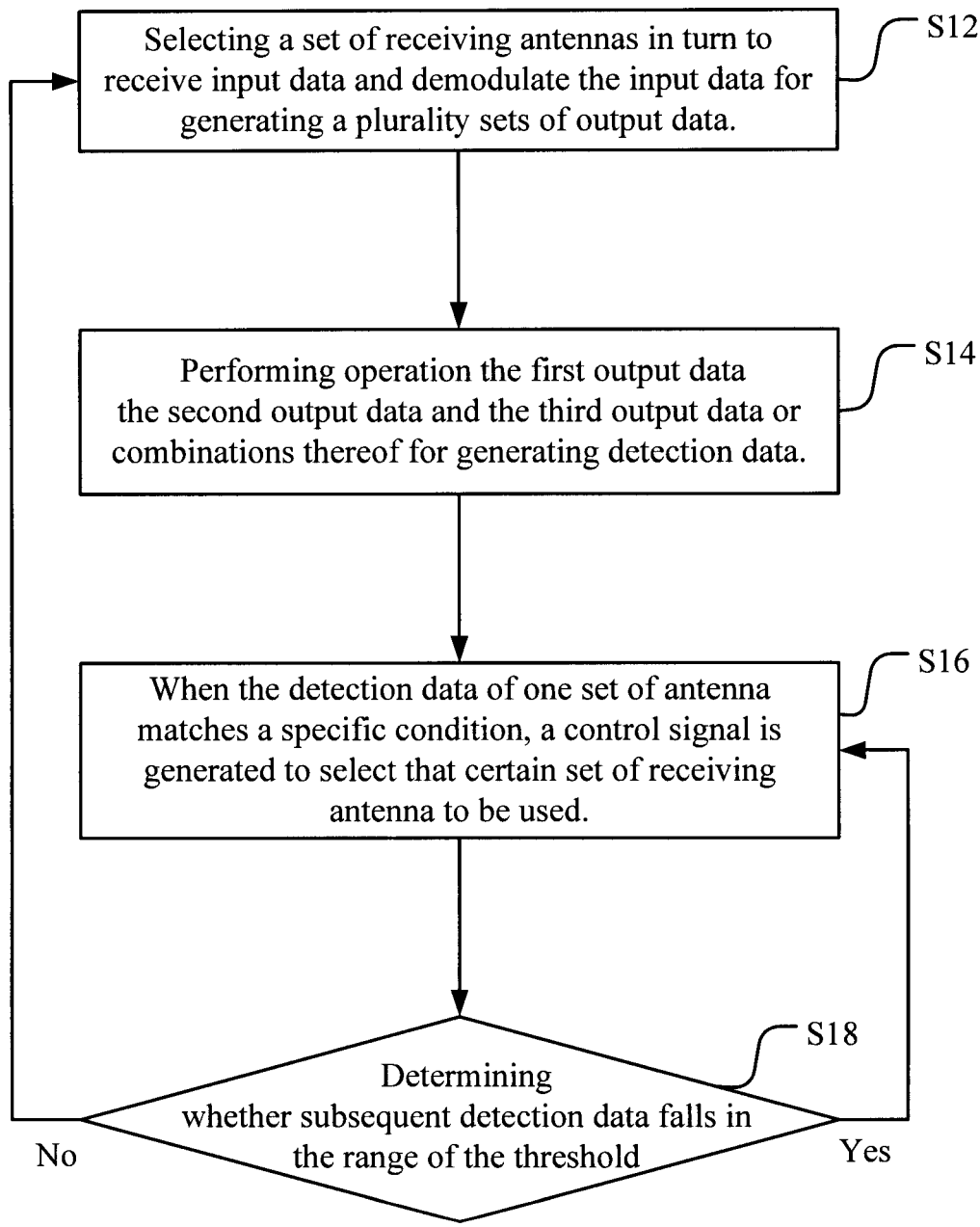
FIG. 3 is a flow chart of an embodiment according to the present invention.

Referring to FIG. 3, a flow chart of an embodiment illustrated according to the present invention is revealed. First, run step S12 by selecting a set of receiving antennas in turn to receive input data and demodulate the input data for generating output data. The sets of output data consists of a first output data, a second output data and a third output data. After demodulation, the first output data is outputted and detected to generate the second output data. Then the second output data is decoded to generate the third output data. Next, by taking step S14, operation is performed on the first output data, the second output data, the third output data or combinations thereof for generating detection data. Referring to step S16, when the detection data of one set of antenna matches a specific condition, a control signal is generated to select that certain set of receiving antenna to be used. Then referring to step S18, the set of receiving antenna is to be used continuously according to the detection data received subsequently. It is also determined in step S18 whether there is a need to turn back to step S12 for resetting a new set of receiving antenna. Or the flow chart is forced back to step S12 within a certain period of time, and a new set of receiving antenna is thereby selected.

It is noted that in step S18, there are several ways to determine whether there is a need to turn back to step S12 by tracking subsequent detection data. One of the methods is to compare detection data of each set of receiving antenna with a threshold. When the detection data falls in the range of the threshold, the receiving antenna corresponding to the detection data is to be selected. Another way is to compare the detection data of each set of receiving antenna repeatedly with a threshold. When the detection data is repeatedly falling in range of the threshold, the corresponding receiving antenna is selected.

Generally, the steps S12, S14, and $S_{16}$ are training modes while step S18 is a normal mode. In an embodiment of the present invention, the receiving antenna is shifted under the training mode while in step S18, the device enters the training mode when transmission quality alters.

In step S12, after receiving at least one packet of a set of receiving antenna, the device shifts to another set of receiving antenna automatically or further runs the steps S14, shifting to another set of receiving antenna after checking that the received packet is actually for itself according to the initial detection data.

In step S16, the detection data of each set of receiving antenna is compared to have a result. Then according to this result, a control signal is generated so as to select a set of receiving antenna to be used. Moreover, in step S16, it is also feasible to compare detection data of each set of receiving antenna with a threshold. When the detection data falls in the range of the threshold, a control signal is generated. The threshold may be the specific condition mentioned above. According to the control signal, the receiving antenna corresponding to the detection data is thereby selected.

In step S16, a set of receiving antenna with better quality is selected according to the detection data obtained from step S12 and step S14, which is repeated a multiple of times. The sum of the detection data such as Post-Detection signal-to-noise ratio may represent the reception quality. Moreover, some sets of receiving antenna may be selected when detected for a multiple of times and that all the detection data is above a threshold. For example, after being detected repeatedly, the Post-Detection signal-to-noise ratio of several sets of receiving antenna is all above a certain dB value. Thus, the receiving antenna with better quality is selected so as to assure the reception quality. Although repeated reception of the detection data improves accuracy of antenna selection, the time consumed is also increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A selecting apparatus for sets of receiving antennas of a Multiple Input Multiple Output wireless system, comprising:
   a selective and control unit, to select a set of receiving antenna, wherein each set of the receiving antenna receives an input data;
   a signal processing module, to process the input data to generate a plurality of output data sets;
   an operation unit, to perform operation on at least one of the multiple sets of output data to generate a detection data; and
   a determining unit, to determine a control signal according to the detection data, the control signal being sent to the selective and control unit for driving the selective and control unit to select a set of antenna to be used.

2. The device as claimed in claim 1, wherein the determining unit further decides whether there is a need to re-select a set of receiving antenna according to the detection data of the antenna to be used, the determining unit compares the detection data of the antenna to be used and a detection data of the antenna currently in use for a threshold difference.

3. The device as claimed in claim 1, wherein the detection data comprising an Error Vector Magnitude, a Post-Detection signal-to-noise ratio, a Channel State Information or combinations thereof.

4. The device as claimed in claim 3, wherein the detection data further comprising a Packet Error Rate (PER), a statistic of the Modulation Coding Scheme or combinations thereof.

5. The device as claimed in claim 1, wherein the signal processing module comprising:
   a plurality of demodulation units, for demodulating the input data and for generating a first output data;
   a detection unit, for detecting the first output data and for generating a second output data; and
   a channel decoding unit, for decoding the second output data to generate a third output data;
   wherein the output data comprises the first output data, the second output data and the third output data.

6. The device as claimed in claim 1, wherein the selective and control unit automatically shifts to select another set of receiving antenna after receiving at least one packet of one set of receiving antenna.

7. The device as claimed in claim 6, wherein the determining unit checks whether the packet is received according to a header at a Media Access Control layer, the determining unit drives the selective and control unit to shift to another set of receiving antenna when a corresponding packet is received.

8. The device as claimed in claim 6, wherein the detection data is obtained from multiple detections of each set of receiving antenna.

9. The device as claimed in claim 1, wherein the determining unit compares the detection data of each set of receiving antenna to have a result and selects a set of receiving antenna to be used according to the result.

10. The device as claimed in claim 1, wherein the determining unit compares the detection data of each set of receiving antenna with a threshold and the set of receiving antenna corresponding to the detection data is selected when the detection data falls into the range of the threshold or when the detection data falls into the range of the threshold repeatedly.

11. The device as claimed in claim 1, wherein the determining unit re-selects a set of receiving antenna after a certain period of time.

12. A selecting method for sets of receiving antennas of a Multiple Input Multiple Output wireless system, comprising the steps of:
   selecting a set of receiving antenna sequentially, with each set of the receiving antenna receiving an input data;
   generating a plurality of output data sets according to the input data;
   generating a detection data through operation of the output data sets; and
   selecting a set of receiving antenna to be used in accordance with the detection data;
   wherein whether there is a need to re-select a set of receiving antenna is determined according to the detection data of the antenna to be used, the need to re-select being further determined by comparing the detection data of the antenna to be used and a detection data of the antenna in use for a threshold difference.

13. The method as claimed in claim 12, wherein the detection data comprising an Error Vector Magnitude, a Post-Detection signal-to-noise ratio, a Channel State Information or combinations thereof.

14. The method as claimed in claim 13, wherein the detection data further comprising a Packet Error Rate (PER), a statistic of the Modulation Coding Scheme or combinations thereof.

15. The method as claimed in claim 12, wherein the output data sets are generated by a plurality of demodulation units, a detection unit and a channel decoding unit.

16. The method as claimed in claim 12, wherein the method further comprising a step of shifting to another set of receiving antenna after receiving at least one packet of one set of receiving antenna.

17. The method as claimed in claim 16, wherein the method further comprising a step of checking whether the packet is received according to a header at a Media Access Control layer, and under the condition that a corresponding packet is received, shifting to another set of receiving antenna.

18. The method as claimed in claim 16, wherein the detection data is obtained from multiple detections of each set of receiving antenna.

19. The method as claimed in claim 12, wherein the method further comprising a step of comparing the detection data of each set of receiving antenna to have a result and a set of receiving antenna is selected according to the result.

20. The method as claimed in claim 12, wherein the method further comprising a step of comparing the detection data of each set of receiving antenna with a threshold and the set of receiving antenna corresponding to the detection data is selected when the detection data falls into the range of the threshold or when the detection data falls into the range of the threshold repeatedly.

21. The method as claimed in claim 12, wherein the determining unit re-selects a set of receiving antenna after a certain period of time.

* * * * *